United States Patent

Ishii et al.

[11] 4,453,682
[45] Jun. 12, 1984

[54] CARTRIDGE HANDLING DEVICE FOR MICROFILM READER OR THE LIKE

[75] Inventors: Keijiro Ishii, Yokohama; Keiji Nakatani, Kawasaki; Seiichi Yamagishi, Machida, all of Japan

[73] Assignee: Minolta Camera Kabushiki Kaisha, Azuchi, Japan

[21] Appl. No.: 369,866

[22] Filed: Apr. 19, 1982

[30] Foreign Application Priority Data

Apr. 23, 1981 [JP] Japan .............................. 56-59464[U]

[51] Int. Cl.³ ...................... G03B 1/04; G03B 23/12; G11B 23/08
[52] U.S. Cl. .................... 242/192; 242/197; 352/78 R
[58] Field of Search ............... 242/192, 194, 197, 198, 242/199, 200; 352/72, 78 R; 360/93, 94, 96.5; 353/26 R, 26 A; 206/387, 389

[56] References Cited

U.S. PATENT DOCUMENTS

| | | | |
|---|---|---|---|
| 3,208,682 | 9/1965 | Pastor et al. | 242/195 X |
| 3,467,340 | 9/1969 | Rosenburgh | 242/197 |
| 3,599,897 | 8/1971 | Wangerin | 242/192 X |
| 3,617,013 | 11/1971 | Ainslie et al. | 242/197 |
| 3,656,703 | 4/1972 | Vockenhuber et al. | 242/192 |
| 3,704,836 | 12/1972 | Yamada | 242/192 |
| 3,845,916 | 11/1974 | Livingston et al. | 242/192 X |
| 3,870,246 | 3/1975 | Yamada et al. | 242/192 |
| 4,120,573 | 10/1978 | Johnston et al. | 353/27 A |
| 4,261,527 | 4/1981 | Sims et al. | 242/198 X |

Primary Examiner—Stuart S. Levy
Assistant Examiner—Scott J. Haugland
Attorney, Agent, or Firm—Wolder, Gross & Yavner

[57] ABSTRACT

A cartridge handling device adapted to be loaded with a cartridge having a roll film wound therein for feeding out the film from the cartridge is characterized by a misloading preventing member provided in a cartridge mount of the device and engageable in an opening formed in the side face of the cartridge toward the proper direction of loading to thereby permit the cartridge to be loaded as oriented only in the proper direction.

1 Claim, 4 Drawing Figures

4,453,682

CARTRIDGE HANDLING DEVICE FOR MICROFILM READER OR THE LIKE

FIELD OF THE INVENTION

The present invention relates to a cartridge handling device for microfilm readers or the like, and more particularly to a cartridge handling device for microfilm readers or the like in which a cartridge having a roll film wound therein is used.

BACKGROUND OF THE INVENTION

Such devices are disclosed, for example, in S. L. Pastor et al. U.S. Pat. No. 3,208,682, N. J. Rosenburgh U.S. Pat. No. 3,467,340 and E. O. Wangerin U.S. Pat. No. 3,599,897. The cartridges to be handled by these devices were of various shapes.

In recent years, however, there is the tendency for cartridges to be generally in the same shape, i.e. in the form of a rectangular parallelepiped which is approximately square in section perpendicular to its film reel axis, in other words, which has four side faces of approximately identical rectangular shape surrounding the film face. The cartridges of such shape include those suited to the device of U.S. Pat. No. 3,208,682 mentioned above, those used for the Ectamate system of Eastman Kodak Co., and those adapted for use with the easy loading system of Minnesota Mining Manufacturing Co. These systems use very similar cartridges but differ in the arrangement for feeding out the microfilm, so that the cartridge specified for one system is not usable for another commonly.

We conducted intensive research in order to provide a device which is universally usable. Consequently, directing attention to the fact that cartridges, even if designed for different systems, have a film outlet approximately at the same position, we already proposed in U.S. patent application Ser. No. 253,461 a system having a film feed roller which is movable into the film outlet. The system is universally usable for any of cartridges to feed the film insofar as the cartridges are similary shaped and have a film outlet at the same location.

However, because various cartridges can be handled universally by the system and because the cartridges to be used have four side faces of the same rectangular shape, the system has the drawback that the user is likely to orient the cartridge improperly when loading it into the system. Even if the cartridge is thus misloaded, the misloading remains unnoticed until the system is actually operated. When the system misloaded with the cartridge is operated for feeding the film, the feeding mechanism and the cartridge will become damaged or have a shortened life.

SUMMARY OF THE INVENTION

Accordingly the main object of the present invention is to provide an improved cartridge handling device.

Another object of the invention is to provide a cartridge handling device capable of preventing misloading of cartridges.

The above main and other objects of the invention can be fulfilled by a cartridge handling device adapted to be loaded with a cartridge having a roll film wound therein for feeding out the film from the cartridge, the device being characterized by a misloading preventing member provided in a cartridge mount of the device and engageable in an opening formed in the outer face of the cartridge toward the proper direction of loading to thereby permit the cartridge to be loaded as oriented only in the proper direction.

More specifically the opening of the cartridge extends from at least one of its side faces surrounding the outer periphery of the roll of film to the inner surface defining a space for accommodating the film, and the misloading preventing member has a guide portion for guiding the film when engaged in the opening.

More specifically the misloading preventing member is removably attached to the device.

More specifically the device has a roller movable into the film outlet of the cartridge for feeding out the film, and the cartridge opening for the misloading preventing member to engage in is an opening into which a film feed roller member is movable in other roll film feeding systems.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE INVENTION

Figure 1:
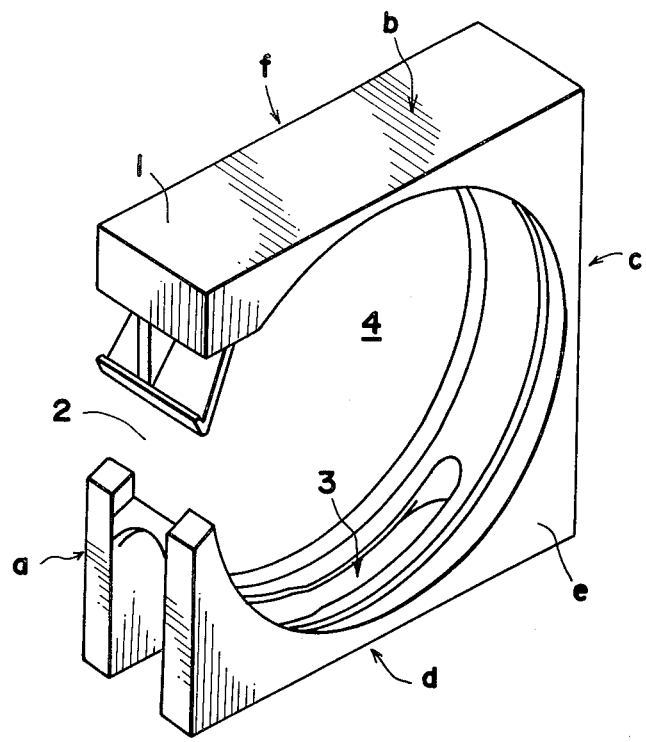
FIG. 1 is a perspective view showing an example of cartridge for use in this invention.

FIG. 1 schematically shows an example of cartridge used in this invention, i.e. a cartridge for use in the Ectamate system of Eastman Kodak Co.

The cartridge 1 is a rectangular parallelepiped having four side faces a, b, c, d of approximately identical rectangular shape and approximately square front and rear faces e, f. The cartridge 1 has a film outlet 2 and an opening 3 into which a film feed roller is movable in the Ectamate system. The opening 3 is formed in the side face a of the cartridge 1 toward the proper direction of loading and also continuously in the side face d adjacent the side face a. The opening 3 extends to the inner surface of the cartridge 1 defining a space 4 for accommodating a roll film, i.e. a microfilm wound on an unillustrated reel.

Figure 2:
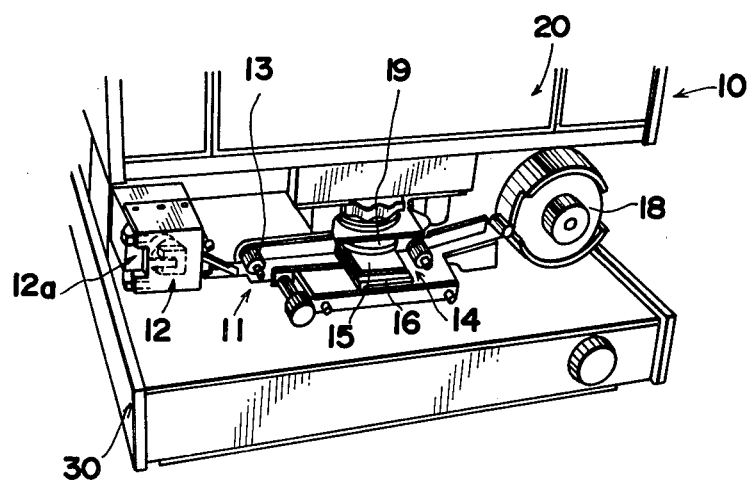
FIG. 2 is a perspective view showing a roll film handling apparatus used for an embodiment of the invention.

FIG. 2 shows a reader 10 having a roll film handling apparatus 11 including a cartridge mount 12. The cartridge 1 is loaded into a pocket portion 12a of the cartridge mount 12. The microfilm fed out from the cartridge by the mechanism to be described later is guided by a guide roller 13, passed between transparent plates 15, 16 of an illuminating assembly 14, further guided by a following guide roller and wound on a take-up reel 18. The roll film is transported by unillustrated drive means and halted at the desired position. The film is then illuminated by a lamp provided below the lower transparent plate 16, and the image is projected on a screen 20 by an optical system including a lens 19.

Figure 3:
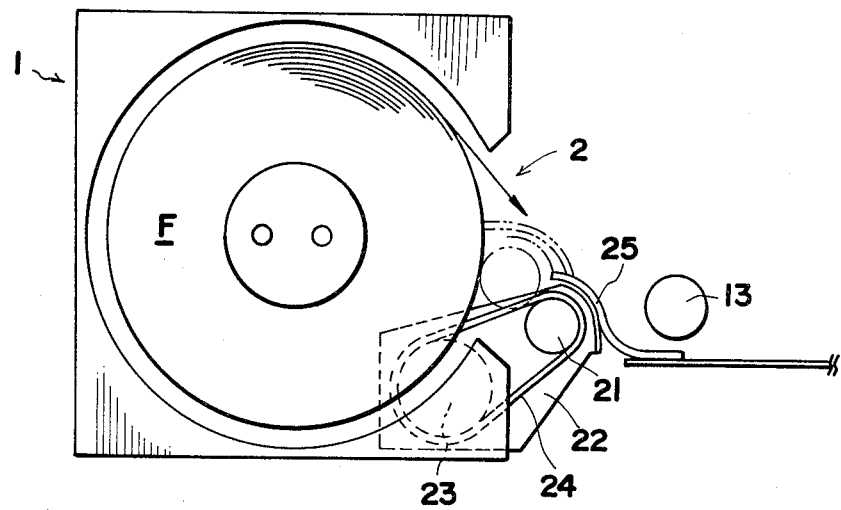
FIG. 3 is a sectional view schematically showing a roll film feeding mechanism of the apparatus.

FIG. 3 schematically shows the mechanism of the roll film feeder of FIG. 2. The mechanism is our proposal already disclosed in Ser. No. 253,461. This mechanism has a film feed roller 21 which is movable into the film outlet 2 of the cartridge 1 to feed the film. The roller 21 is supported at its one end by a support plate 22 pivotably provided on the remote side of the cartridge 1 in FIG. 3 and extends toward the user. The roller 21 is coupled by a belt 24 to a drive roller 23 coaxial with the pivot of the support plate 22 and is rotated counterclockwise. The support plate 22 has a flexible guide member 25 which comes into contact with the periphery of the roll film F when the roller 21 is brought into the outlet 2 to separate the leading end of the film F from its roll and guide the film to the guide roller 13.

When a feed signal is given with the cartridge 1 set in the position of FIG. 3, the roller 21 rotates counterclockwise, and the support plate 22 moves counterclockwise to bring the roller 21 into the film outlet 2. The roll film F is rotated by the roller 21 clockwise, and the film leading end is separated by the guide member 25 and guided to the guide roller 13. The feeding mechanism is usable not only for cartridges of the Ectamate system but also for various other cartridges, for example, of the easy loading system mentioned for feeding out a roll film from the cartridge as already described.

The opening 3 is not necessary for the film feeding mechanism described with reference to FIG. 3. The present invention is to be described with reference to FIG. 4 utilizes the fact that the opening 3 is unnecessary for feeding out the film and is formed also in one side face a of the cartridge 1 toward the proper direction of loading. A cartridge mount 12 for the film feeder has a misloading preventing member 40 formed only in the proper direction of loading of the cartridge 1 into a pocket portion 12a of the mount and engageable in the opening 3 including the portion thereof in the side face a for permitting the cartridge 1 to be loaded in place as oriented only in the proper direction. Thus even if the cartridge 1 is to be loaded with one of the side faces b, c and d directed forward improperly, the misloading preventing member 40 comes into contact and interferes with that side face to prevent loading.

In this way, the member 40 prevents loading by interference even if it is attempted to set the cartridge in an improper orientation, thereby indicating the improper orientation and enabling the user to correct the orientation immediately and load the cartridge properly. When the film feeder is operated with the cartridge set in a wrong orientation, an objectionable force will act on the feeding mechanism, the cartridge, etc. to cause damage or result in a shortened life. Such a situation is avoidable by the present embodiment.

As the cartridge 1 is loaded into the mount 12 as properly oriented, the misloading preventing member 40 permits the loading while progressively engaging into the opening 3. The member 40 has a guide surface 40a which closes the portion 3a of the opening 3 at the cartridge inner surface defining the film accommodating space 4 and which is substantially flush with the inner surface when the cartridge 1 has been fully loaded into the mount 12. The guide surface 40a guides the film, preventing the film leading end from engaging in or jamming the opening portion 3a and assuring a smooth feeding operation.

Figure 4:
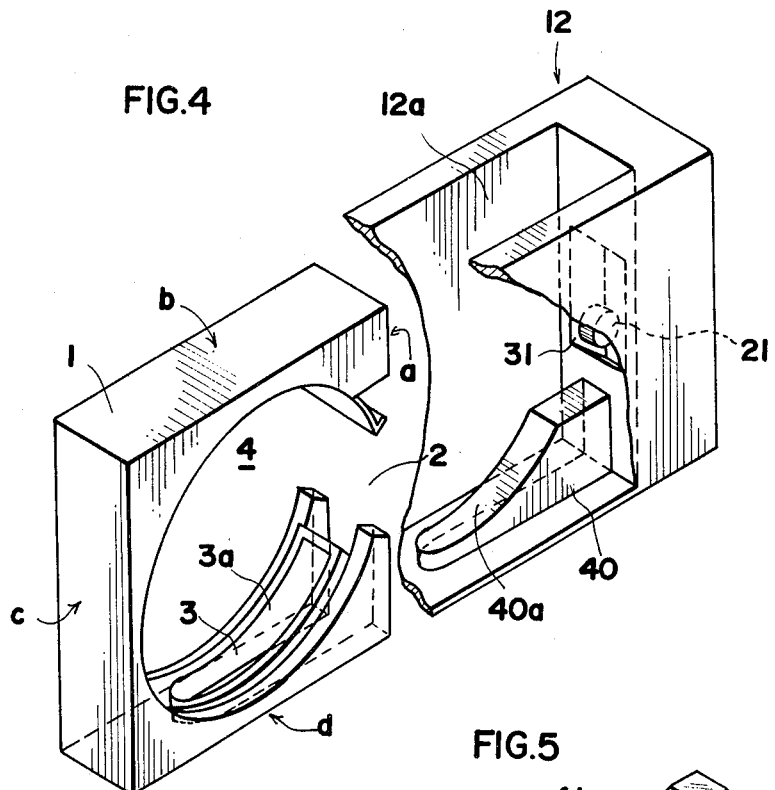
FIG. 4 is a perspective view showing the embodiment of the invention.

Indicated at 31 in FIG. 4 is an aperture formed in the mount 12 for permitting retraction of the film feed roller 21. For a simplified description, the means for driving the roller 21 and means for moving the roller into or out of the cartridge will not be described.

The misloading preventing member 40 shown in FIG. 4 is partly made of a magnet, and the pocket portion 12a opposed thereto is made of a magnetic material to render the member 40 removably mountable. This leads to the advantage that when cartridges with differently shaped openings 3 are used, misloading preventing members conforming to the shapes of the openings 3 are interchangeably usable. The misloading preventing member may be removably mounted by any means, for example, with a screw or by fitting.

Figure 5:
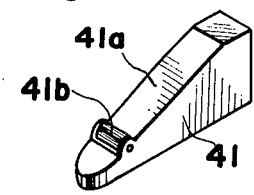
FIG. 5 is a perspective view showing another embodiment of misloading preventing member of the invention.

FIG. 5 shows another embodiment of misloading preventing member. The misloading preventing member 41 has a guide roller 41b on the surface 41a thereof to be opposed to the film accommodating space 4 for guiding the film with reduced friction. Thus the member 41 is adapted to feed out the film with improved smoothness.

According to the embodiments described above, the cartridge is loaded or unloaded in a direction at right angles with the axis of rotation of the roll film accommodated therein. However, the invention can of course be embodied similarly for loading or unloading cartridges along the axis. The cartridge opening in which the misloading preventing member is engageable may be some other existing opening or may be formed specifically for the prevention of misloading. In the latter case, the same opening can be formed in various cartridges, and the mount will be provided with one kind of misloading preventing member.

Although the present invention has been fully described by way of examples with reference to the accompanying drawings, it is to be noted that various changes and modifications will be apparent to those skilled in the art. Therefore, unless otherwise such changes and modifications depart from the scope of the invention, they should be construed as being included therein.

We claim:

1. In a cartridge handling device employable with cartridges used in different cartridge film feeding systems, the film feeding system comprising:

a cartridge mount located in said device and having a cartridge receiving pocket;

a wound film containing cartridge of parallelepiped configuration with square front and rear faces perpendicular to the axis of the contained wound film and rectangular peripheral faces, a first of said peripheral faces having a film outlet and an opening into which a film feed roller member is movable and which communicates with the interior of the cartridge;

a misloading preventing member separably located in said receiving pocket and separably engagable with said opening only when said cartridge is properly oriented in said receiving pocket and having a guide face functioning as a film guide when said member engages said opening; and a feed roller located in said device and movable into said cartridge disposed in said pocket.

* * * * *